United States Patent
Lessen

[19]

[11] Patent Number: 5,454,986
[45] Date of Patent: Oct. 3, 1995

[54] DOWN-FLOW BATCH MIXING SYSTEM

[76] Inventor: Martin Lessen, 12 Country Club Dr., Rochester, N.Y. 14618

[21] Appl. No.: 286,070

[22] Filed: Aug. 4, 1994

[51] Int. Cl.⁶ .................................................. B01D 47/16
[52] U.S. Cl. ........................... 261/93; 366/264; 366/270; 366/302; 366/314
[58] Field of Search ..................... 366/102, 103, 366/104, 262, 263, 264, 265, 270, 314, 302, 106, 107; 261/87, 93

[56] References Cited

U.S. PATENT DOCUMENTS

| | | | |
|---|---|---|---|
| 614,522 | 11/1898 | Whiting | 366/296 |
| 829,356 | 8/1906 | Smith | 366/296 |
| 1,255,944 | 2/1918 | Stevens | 366/270 |
| 1,351,352 | 8/1920 | Stevens | 366/270 |
| 1,592,713 | 7/1926 | Bendixen | 366/302 |
| 1,854,761 | 4/1932 | Perkins | 366/270 |
| 1,960,613 | 5/1934 | Wolf et al. | |
| 1,982,002 | 11/1934 | Hatch | 366/270 |
| 2,016,647 | 10/1935 | McMartin | |
| 2,038,221 | 4/1936 | Kagi | 366/302 |
| 2,123,496 | 7/1938 | Briggs | |
| 2,131,105 | 9/1938 | Hill | 366/265 |
| 2,433,592 | 12/1947 | Booth | |
| 2,521,396 | 9/1950 | Moul | |
| 2,854,320 | 9/1958 | Fields | 422/135 |
| 3,092,678 | 6/1963 | Braun | 366/270 |
| 3,488,038 | 1/1970 | Staaf | |
| 3,875,057 | 4/1975 | Kaelin | |
| 4,054,519 | 10/1977 | Tufts | |
| 4,190,371 | 2/1980 | Durr et al. | |
| 4,207,275 | 6/1980 | Stanton et al. | |
| 4,290,885 | 9/1981 | Kwak | 261/93 |
| 4,454,078 | 6/1984 | Engelbrecht et al. | |
| 4,919,849 | 4/1990 | Litz et al. | 261/87 |

FOREIGN PATENT DOCUMENTS

| | | | |
|---|---|---|---|
| 75078 | 12/1952 | Denmark | 261/93 |
| 30167 | 7/1959 | Finland | 366/270 |

OTHER PUBLICATIONS

The Attainment of Homogeneous Suspension in a Continuous Stirred Tank, by S. Aeschbach & J. R. Bourne, The Chemical Engineering Journal, Elsevier Sequoia S.A., Lausanne (1972).

*Primary Examiner*—David A. Scherbel
*Assistant Examiner*—Tony G. Soohoo
*Attorney, Agent, or Firm*—M. Lukacher

[57] ABSTRACT

Improved mixing effectiveness in the mixing of a gas with a liquid suspension is achieved in a batch mixing system having a mixing tank with a hemi-toroidal tank bottom which extends between a radially inner neck portion of the tank to a radially outer cylindrical wall portion of the tank. The hemi-toroidal profile of the tank bottom has a monotonically increasing toroidal radius between the neck and wall portions. Disposed within the tank is an assembly including an axial flow impeller with pitched impeller blades, a stator adjacent to the impeller and having stationary stator blades of a pitch opposite to the pitch of the impeller blades, a shroud surrounding the radial periphery of both the impeller and the stator and a gas sparging means supported by the shroud. The arrangement of the assembly provides in conjunction with the hemi-toroidal tank bottom a substantially swirl-free laminar flow of the liquid suspension directed downwardly along the neck portion and along the tank bottom when the impeller is rotatably driven by a drive shaft.

12 Claims, 5 Drawing Sheets

DOWN-FLOW BATCH MIXING SYSTEM

FIELD OF THE INVENTION

The present invention generally relates to batch mixing systems in which a batch of a liquid or a batch of a liquid suspension is mixed with a gas and, more particularly, the invention relates to a down-flow batch mixing system providing an improved mixing effectiveness through a design which establishes mixing conditions of a substantially swirl-free laminar liquid flow.

BACKGROUND OF THE INVENTION

In batch mixing, a batch of a liquid or of a liquid suspension is loaded into a mixing tank and means for introducing a gas into the liquid is provided. An impeller-type agitator provides agitation of the liquid or of the liquid suspension while the gas to be reacted with the liquid suspension is introduced, usually by nozzles or so-called sparging rings in the form of gas bubbles. The mixing process proceeds until a selected process indicator indicates a desired degree of completion of a chemical reaction between the liquid suspension and the gas, whereupon the mixing process is terminated and the thus reacted product is emptied from the mixing tank. Numerous batch mixing systems are known in which improved mixing effectiveness has been sought by introducing a number of particular mixing system designs, tailored to achieve particular results. A measure of the effectiveness of the mixing process in a batch mixing system is a quantity referred to as a "mass transfer coefficient," which provides an indication of the effectiveness of mass transfer during the mixing process. The literature on batch mixing systems is replete with examples of improved designs for an agitator, impeller, or propeller, the incorporation of baffles disposed on the inside wall of a mixing tank, the introduction of draft tubes functioning as shrouds, and various gas introduction means and their location with respect to the impeller within the mixing tank. In some mixing system designs a stator having stationary blades or vanes is used in proximity to the impeller so as to achieve improved mixing characteristics for certain materials or under certain conditions.

Another design variable disclosed in the literature is the mixing tank itself and, more particularly, the design of the tank bottom of a mixing system. As viewed from the inside of a mixing tank, tank bottom may be a flat bottom or it may be a concave bottom, or as is the case in certain pressure vessels, it may be a convex bottom. Thus, with respect to the contour of the bottoms of mixing tanks, the disclosures known to the applicant can be accurately classified as follows:

Mixing systems having a flat bottom are disclosed in the following U.S. Pat. Nos.: 4,454,078 (Jun. 12, 1984); 4,190,371 (Feb. 26, 1980); 4,207,275 (Jun. 10, 1980); 3,875,057 (Apr. 1, 1975); 2,433,592 (Dec. 30, 1947); and 1,255,944 (Feb. 12, 1918).

Contoured tank bottoms or chamber bottoms are disclosed in the following patents: U.S. Pat. No. 4,054,519 (Oct. 18, 1977) discloses a hydraulic attrition unit for a marine toilet, showing in a portion a FIG. 3A thereof, a hemi-toroidal chamber bottom. In U.S. Pat. No. 3,488,038 (Jan. 6, 1970) there is disclosed a stirrer, shown in a FIG. 1 as having a propeller (18) directing liquid flow downwardly toward a contoured and rotating flow guiding body (19), whereupon the liquid is shown as flowing along a flat bottom portion of a container (11), and past suppressor vanes (20) attached to side walls of the container. U.S. Pat. No. 2,521,396 (Sep. 5, 1950) discloses a gas and liquid contact apparatus, showing in a FIG. 1 thereof a tank (1) having a uniformly concave tank bottom, an impeller (9) and a rotary gas target (11) attached to a shaft 10). The rotary gas target or gas distribution system directs a gas upwardly toward the impeller. The impeller (9) directs a liquid flow upwardly. In U.S. Pat. No. 2,123,496 (Jul. 12, 1938) there is disclosed drink mixer having a toroidally shaped bottom of a receptacle (12), as depicted in a FIG. 1 thereof. In U.S. Pat. No. 2,016,647 (Oct. 8, 1935) there is disclosed a device for treating paper stock, FIGS. 1–3 thereof showing in these embodiments various contoured bottoms of a receptacle (10), and indicating tubular members or shrouds having various configurations (15, 15a, 15b, and 15c). In U.S. Pat. No. 1,960,613 (May 29, 1934) there is disclosed a method for bleaching paper pulp, and showing in FIGS. 1 and 2 thereof a tank (1) having a hemi-toroidal tank bottom delineated by a central ridge (9), an axial flow impeller (3), and a degrader (2) in which the pulp is given a downward movement (FIG. 1) by the impeller and alternatively an upward movement (FIG. 2).

Another publication, titled *The Attainment of Homogeneous Suspension in a Continuous Stirred Tank*, by S. Aeschbach and J. R. Bourne, *The Chemical Engineering Journal*, Elsevier Sequoia S. A., Lausanne (1972) describes results of a comprehensive study of various configurations of tanks and positions of an impellets immersed into a suspension of PMMA particles in a hydrocarbon liquid. This publication does not address the question of mixing, rather it attempts to address the particle size distribution in the liquid before and after stirring of the liquid suspension by impellers. In that publication, on pages 238 and 239 thereof, there are shown as a "case 6" and a "case 7" a system within a tank having a hemi-toroidal tank bottom and having baffles in the form of a draft tube. The propeller directs the flow of the liquid suspension upwardly. The particle size distribution curves shown in FIGS. 6 and 7, respectively, indicate that a more homogeneous suspension is retained after a period of agitation of the suspension by using the configurations and conditions described as "case 6" and "case 7", respectively. The conclusions of that publication, on page 242 thereof, indicate that conventional flat-bottomed propeller agitated tanks were not producing homogeneous suspensions, while the empirically determined contoured tank bottom provided more homogeneous suspensions in terms of the measured particle size distribution. It is also pointed out in the conclusions section that constant propeller tip speed was seen as the relevant criterion to provide homogeneous suspensions in a scaled up version of the stirrer apparatus having the contoured bottom.

It is apparent from a detailed review of the foregoing publications, and as related to batch mixing systems, that at least the following major aspects or features of a batch mixing system designed for mixing a gas with a liquid suspension have either not been considered or have not been appreciated in the prior art with respect to an influence of any one aspect or feature or of a combination of aspects or features on a measure of mixing effectiveness achievable in a batch mixing system:

(i) the influence of swirl and turbulence of the liquid flow as induced by an impeller disposed in a mixing tank;

(ii) the influence of the contour or profile of the bottom of a mixing tank in the case of a "down-flow" batch mixing system, i.e., a batch mixing system in which an impeller provides a flow of a liquid suspension which is initially directed downwardly toward the tank bottom; and (iii) the influence of the disposition within a mixing tank of an assembly including at least an impeller, a stator adjacent to the impeller, a shroud adjacent to a radial periphery of both the impeller and the stator, and a gas sparging means radially coextensive with the shroud.

Accordingly, it is desirable to provide a batch mixing system having an improved mixing effectiveness for mixing a gas with a liquid suspension. Such an improved mixing system can be advantageously used in the fields of fermentation, aeration, and generally in mixing applications using reactive gases to promote controlled chemical reactions in liquid suspensions.

SUMMARY OF THE INVENTION

It is the principal object of the present invention to provide a down-flow batch mixing system for mixing a gas with a liquid suspension under conditions of substantially swirl-free laminar liquid flow.

Another object of the invention is to provide a down-flow batch mixing system which produces improved mixing effectiveness of a gas and a liquid suspension.

A further object of the present invention is to provide a down-flow batch mixing system having a tank with a hemi-toroidal tank bottom extending with a monotonically increasing toroidal radius from a centrally disposed cylindrically shaped neck portion to a cylindrically shaped and concentric upper portion of an outer tank wall.

A still further object of the present invention is to provide an improved down-flow batch mixing system in which an axial flow impeller, a stator disposed adjacent thereto, a shroud extending around the periphery of both the impeller and the stator, and a sparging ring are arranged within the tank and with respect to the toroidal tank bottom such that substantially swirl-free laminar liquid flow is achieved within the tank.

Briefly described, the present invention provides a down-flow batch mixing system for mixing a gas with a liquid suspension under conditions of substantially swirl-free laminar liquid flow, in which a mixing tank has about a central axis a hemi-toroidal tank bottom extending with a monotonically increasing toroidal radius from a cylindrically shaped neck portion formed by tank walls proximate the central axis to a cylindrically shaped upper portion of a tank wall formed radially outwardly from this neck portion. The mixing system also has an impeller hub which is radially coextensive with an end face of the neck portion of the tank and which is rotatably disposed thereon, and rotatably driven by a drive shaft. An axial flow impeller is mounted to the impeller hub. The impeller has pitched impeller blades, and upon rotation the impeller directs the liquid suspension in a substantially laminar flow downwardly along the neck portion and along the hemi-toroidal tank bottom. Thus, where the impeller (is upstream of the stator or another counter-rotating blade assembly) the pitches of the impeller and stator blades or blades of a second counter rotating blade assembly are such that the flow leaving the stator or counter rotating blade assembly is essentially axial. Similarly, where the stator is upstream of the impeller, the pitches of the impeller and stator are such that the flow leaving the impeller is essentially axial. The stator is disposed adjacent to and radially coextensive with the impeller. A shroud extends radially around the periphery of both the impeller and the stator. A sparging ring, which provides the gas to be mixed with the liquid suspension, is disposed on the shroud and is radially coextensive therewith.

Thus, the present invention provides a down-flow batch mixing system in which a tank having a particular hemi-toroidal tank bottom cooperates with an assembly including an impeller, a stator, a shroud, and a sparging ring to produce conditions of substantially swirl-free laminar liquid flow so that an improved mixing effectiveness is obtained in the mixing of a gas with a liquid suspension. The gas is introduced in a region of high speed flow and immediately upstream of a region of high shear.

BRIEF DESCRIPTION OF THE DRAWINGS

The present invention will be better understood and appreciated more fully from the following detailed description, taken in conjunction with the accompanying drawings, in which.

DETAILED DESCRIPTION OF THE EMBODIMENTS

Figure 1:
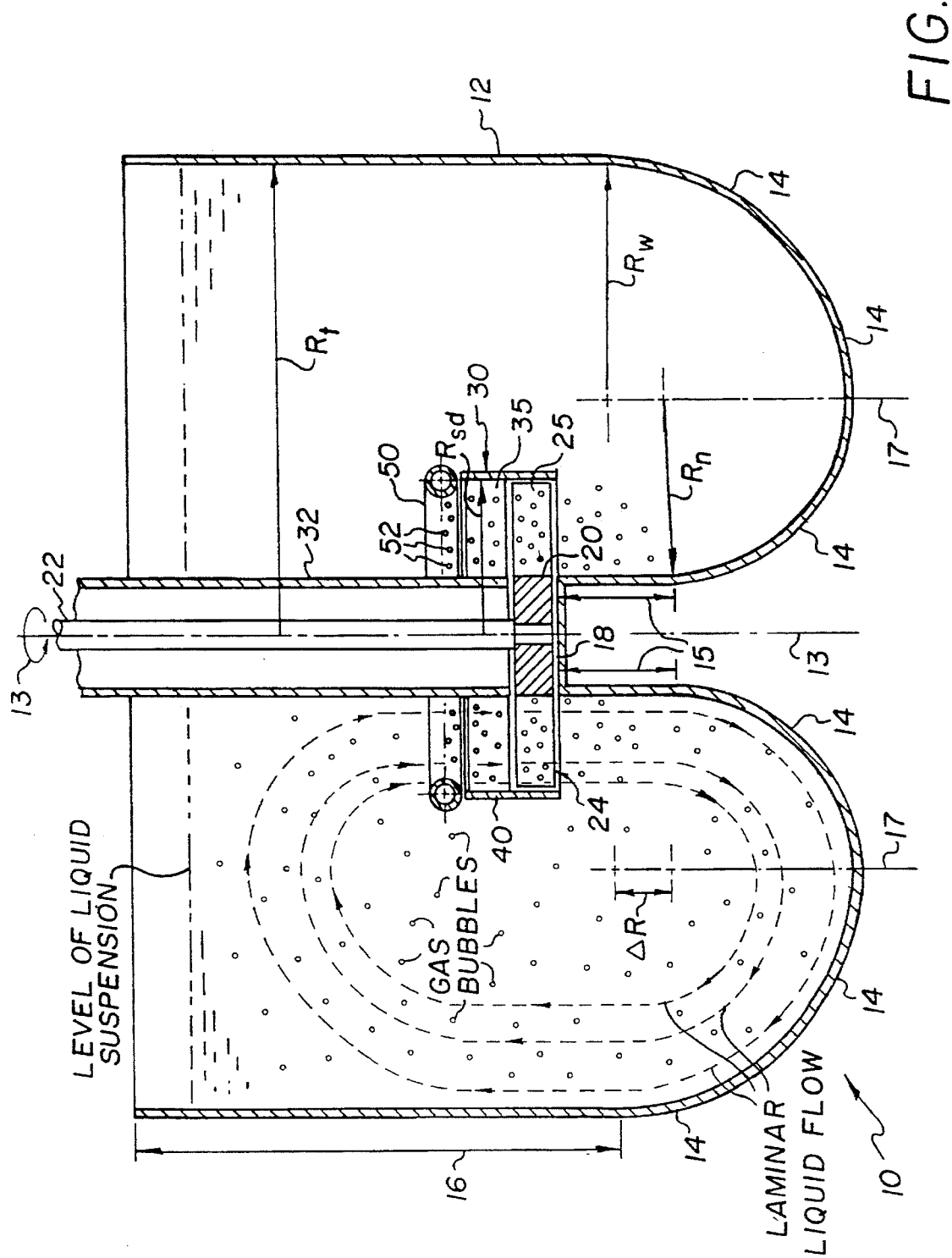
FIG. 1 shows in a cross-sectional view a first embodiment of the down-flow batch mixing system in accordance with the present invention, in which a support tube supports a stator with a sparging ring thereon, and a drive shaft extending coaxially within that support tube to an impeller hub, the hub being radially coextensive with an end face of a cylindrical neck portion of a mixing tank. Also indicated schematically are two of the toroidal radii which, in combination, provide the monotonically increasing toroidal radius of the tank bottom extending from the cylindrical neck portion to a cylindrical outer wall portion of the tank.

Referring now to FIG. 1, there is depicted a first embodiment of a down-flow batch mixing system shown in a cross-sectional view. The mixing system 10 has a mixing tank 12 with a central axis 13. Radially concentric with the axis 13 are cylindrically shaped upper side wall portions 16 and a cylindrically shaped neck portion 15, the neck portion terminating at an upper face 18. A contoured hemi-toroidal tank bottom, indicated at 14, extends with a monotonically increasing toroidal radius from the cylindrically shaped neck portion 18 to the cylindrically shaped upper side wall portion 16. The monotonically varying radius of the hemi-toroidal tank bottom is schematically indicated by two toroidal radii $R_n$, and $R_w$, these radii drawn about toroidal center lines indicated at 17. The toroidal radius $R_n$ denotes the shortest radius emanating from the cylindrical neck portion 15, while the toroidal radius $R_w$ denotes the largest radius where the tank bottom merges into the cylindrically shaped upper side wall portion 16. The difference between $R_w$ and $R_n$ is indicated as $\Delta R$. An impeller hub 20 is shown disposed above the upper end face 18 of the neck portion 15, the hub being radially coextensive with the radial dimensions of the neck end face as viewed from the inside of the tank 12, and the impeller hub is rotatably driven by a drive shaft 22. An axial flow impeller, indicated at 24 has impeller blades 25 extending radially outwardly from the hub 20. The impeller blades 25 (not shown in detail) have a pitch such that the impeller induces an initially downwardly directed flow of a liquid suspension along the neck portion 15 and the contour lines 14 of the tank bottom, thus referring to this mixing system as a "down-flow" mixing system. Shown positioned adjacently above the impeller 24 is a stator, indicated at 30 having a plurality of stationary stator blades 35 (not shown in detail), the stator blades 35 having a pitch such that the swirl induced by the stator 30 is essentially removed by the rotating impeller blades 25 thus substantially reducing the magnitude of swirl components of liquid flow in the mixing system 10. The stator 30 is fixedly attached to a cylindrical support tube 32, the tube having an outer diameter which is radially coextensive with the diameter of the impeller hub 20. The support tube 32 is concentric about the drive shaft 13. A shroud 40 is indicated as extending adjacently around the periphery of both the impeller 24 and the stator 30, the impeller and the stator being substantially radially coextensive. Shown disposed above the stator 30 and radially coextensive with the shroud 40 is a sparging ring 50 having apertures 52 through which a gas is introduced into the rapidly down-flowing liquid in the form of gas bubbles in a manner well known in the art of mixing systems.

Substantially swirl-free laminar liquid flow conforming to the hemi-toroidal contour of the tank bottom and being directed downwardly by the impeller 24 tangentially along the cylindrical neck portion 15, is schematically indicated by dashed outlines with small arrows indicating the direction of flow of the liquid suspension. Gas bubbles are depicted throughout the liquid suspension in the tank as a way to indicate in the drawing that the substantially swirl-free laminar liquid flow conditions achievable in the mixing system 10 of the invention provide for a significantly enhanced residence time of small gas bubbles in the liquid suspension by having minimized regions of swirl and turbulence of the flowing liquid.

The shroud 40 has a radially inwardly facing cylindrical surface indicated as having a radius $R_{sd}$, and an inwardly facing surface of the cylindrical portion 16 of the tank wall 12 is shown with a radius $R_t$. It can be shown that conditions of substantially swirl-free laminar flow of the liquid suspension can be maintained so long as the ratio Rsd/Rt does not exceed a value of 0.35.

Figure 2:
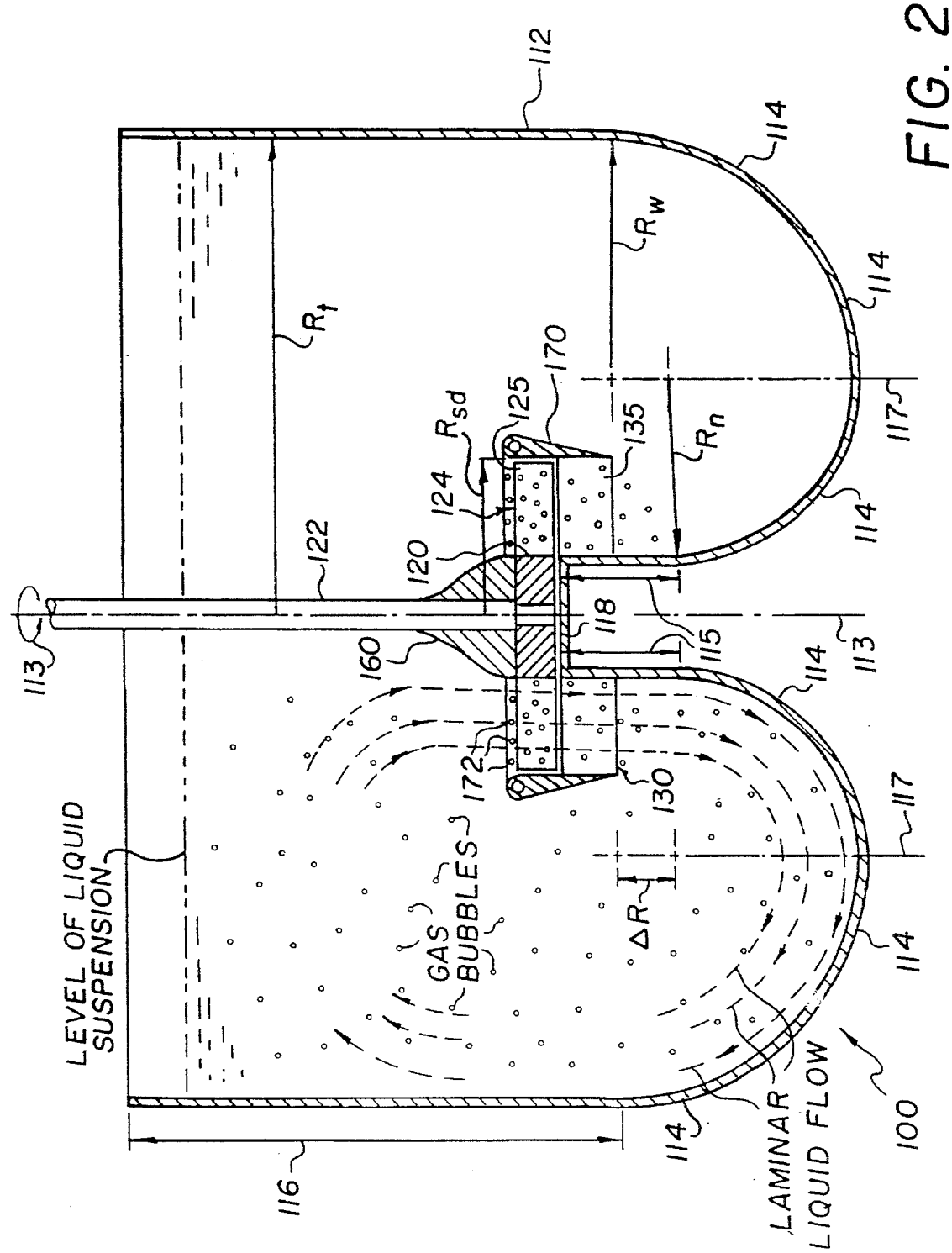
FIG. 2 depicts a down-flow batch mixing system in accordance with a second embodiment of the invention, in which a stator is disposed on a portion of a cylindrical neck portion of a mixing tank, and an impeller rotatably driven by a drive shaft extending into an impeller hub, the drive shaft having a fairing radially coextensive with the impeller hub, and a unitary member surrounding the radial periphery of both the stator and the impeller, in which the unitary member functions as both a shroud and a sparging ring.

Referring now to FIG. 2, there is depicted a cross-sectional view of a down-flow batch mixing system (100).The embodiment of the mixing system shown in FIG. 2 differs from that of FIG. 1 in the mounting of a stator 130, and in the attachment of a drive shaft 122 to an impeller hub 120, as well as in the use of a unitary member 170 which serves both as a shroud and a sparging ring in this embodiment.

The stator 130 is shown as positioned below an impeller 124, the stator 130 fixedly attached to the inner walls of a portion of a cylindrical neck portion 115 of a mixing tank 112. Fixedly attached to a radial periphery of the stator 130 is the unitary member 170 which has at an upper portion thereof an integrally formed gas sparging ring having apertures 172. Disposed above the stator 130 and adjacent an upper surface 118 of an end face of the neck portion 115 is the impeller hub 120 which is radially coextensive with the upper surface 118. An impeller 124 is rotatably driven by the drive shaft 122, the drive shaft having a fairing 160 shown as smoothly contoured between the shaft and the impeller hub 120 and radially coextensive with the hub at the upper surface thereof. The blading pitches of the impeller 124 and stator 130 are such that the flow leaves the stator with substantially no swirl.

Features and functions not described with respect to the batch mixing system 100 of FIG. 2 are identical to features and functions of the batch mixing system described in conjunction with FIG. 1.

Figure 3:
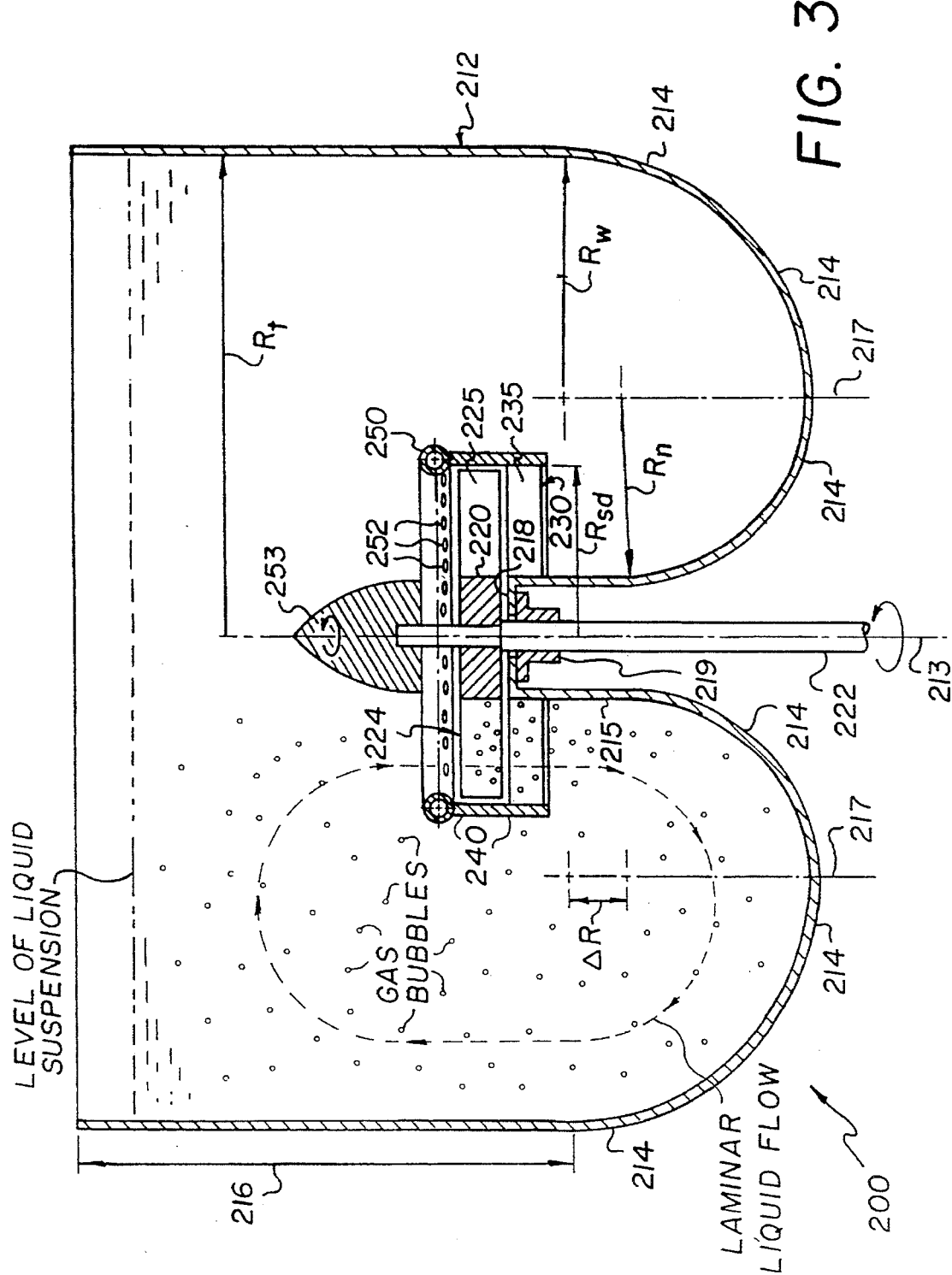
FIG. 3 shows a down-flow batch mixing system in accordance with a third embodiment of the invention, in which a stator and a sparging ring are supported by the cylindrical neck portion of the mixing tank, and a drive shaft extends axially through an end face of said cylindrical neck portion of the mixing tank to an impeller hub radially coextensive with the end face of the neck portion.

Referring now to FIG. 3, there is shown in cross-sectional view a down-flow batch mixing system 200 which depicts a third embodiment having a different arrangement with respect to a drive shaft 222 and a tank cylindrical neck 215 which also serves to support a stator 230, a shroud 240, and a sparging ring 250.

In the batch mixing system 200, the drive shaft 222 is shown as extending axially through an end face 218 of a cylindrically shaped neck portion 215 of a mixing tank 212 through a bushing 219 attached to the end face 218, the bushing 219 having a fluid seal (not shown). Rotatable drive shaft 222 is attached to an impeller 225 having a hub 220 which is shown to be radially coextensive with the cylindrical neck portion 215 as viewed from inside the tank 212. The stator 230 is supported by the tank cylindrical neck 215 which extends axially upwardly through the stator. A conoidal fairing 253 is provided to streamline the upper face of the impeller hub. Fixedly attached to the radial periphery of the stator 230 is a shroud 240, and the sparging ring 250 is attached to an upper end portion of the shroud 240.

It is to be understood that a magnetic drive could function to drive the impeller through the tank neck wall and thus, to obviate the need for a seal.

All other features and functions of the batch mixing system 200 of FIG. 3 not specifically described, are identical to the features and functions of the embodiment shown in FIG. 1.

Figure 4:
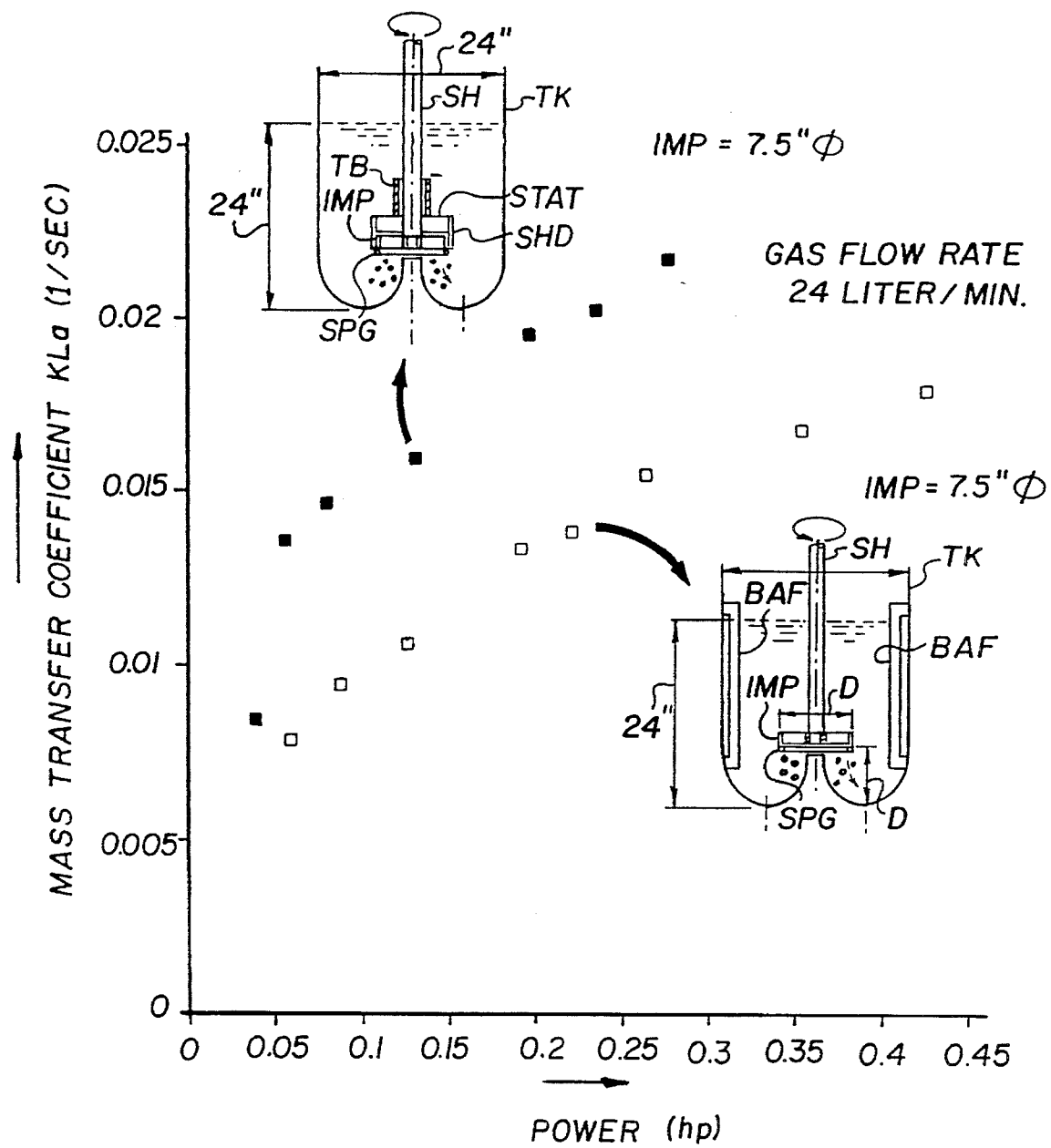
FIG. 4 is a graphical presentation of mass transfer coefficient versus power applied to an impeller drive shaft, and comparing the performance of a down-flow batch mixing system in accordance with the invention to the performance of an identically contoured mixing tank having baffles disposed along the inside of the outer tank walls and having an impeller and a sparging ring only.

Referring now to FIG. 4, there is shown a functional relationship between a mass transfer coefficient kLa and the power applied to a drive shaft of a batch mixing system. The mass transfer coefficient is a measure of the effectiveness of mixing components (for example, a gas and a liquid suspension) in a batch mixing system, i.e., a higher value of the mass transfer coefficient at a given input power to an impeller drive shaft of a mixing system indicates a higher mixing effectiveness for that system under specified conditions (such as, for example, the diameter of a mixing tank, the level of the liquid suspension in the tank, the impeller diameter, and the gas flow rate).

In FIG. 4, an upper set of data points denoted by solid squares is associated with a mixing system in accordance with an embodiment of the invention, shown as an inset adjacent to that set of data points for an impeller diameter of 7.5 inches and for a gas flow rate of 24 liters per minute through a liquid suspension contained in a tank. The inset schematically depicts the mixing tank of the invention as having an inside diameter of 24 inches and being filled with a liquid suspension to a level of 24 inches as measured from the lowest point of the hemi-toroidal tank bottom. For purposes of clarity of presentation, the major components of the mixing system are denoted here by letters, wherein TK denotes a tank, SH denotes a drive shaft, TB denotes a cylindrical support tube supporting a stator STAT and a shroud SHD, a sparging ring SPG shown attached to a lower end face of the shroud SHD, and the shaft rotatably driving an impeller IMP. Thus, the mixing system in accordance with the invention depicted in the upper portion of FIG. 4 differs from the embodiments shown in FIGS. 1–3 in that the sparging ring SPG is disposed below the impeller IMP.

In FIG. 4, a lower set of data points denoted by open squares shows the functional relationship between the mass transfer coefficient kLa and the power applied to a drive shaft SH for a mixing system associated with that set of measured data and shown in the lower right-hand portion of FIG. 4. This mixing system also uses an impeller of a diameter of 7.5 inches and a gas flow rate of 24 liters per minute emanating from a sparging ring SPG disposed below an impeller IMP. Here the tank TK is identical to the tank of the mixing system of the invention, and the level of the liquid suspension is again held at 24 inches as measured from the lowest point of the toroidally contoured tank bottom. However, in contrast to the mixing system of the invention, the mixing system associated with the open square data set has disposed around the inside wall of the tank TK a series of four conventional baffles BAF (only two are shown) and that system neither has a shroud nor a stator. A drive shaft SH rotatably drives an impeller IMP. An axial distance between a lower impeller surface and the hemi-toroidal bottom of the tank is indicated to be identical to the impeller diameter D (7.5 inches).

It is evident from FIG. 4 that the mixing effectiveness of the mixing system in accordance with an embodiment of the invention is measurably higher throughout the range of power applied to the drive shaft SH than the mixing effectiveness of the baffled system having only an impeller and a sparging ring. Thus, while both batch mixing systems shown in FIG. 4 use an identical tank TK having the hemi-toroidal tank bottom in accordance with the invention, it is apparent that the mixing effectiveness of the mixing system having an assembly including a stator, a shroud, an impeller, and a sparge ring arranged within the tank in accordance with the invention provides for any improved mixing effectiveness in a mixing process in which a gas is mixed with a liquid suspension.

Figure 5:
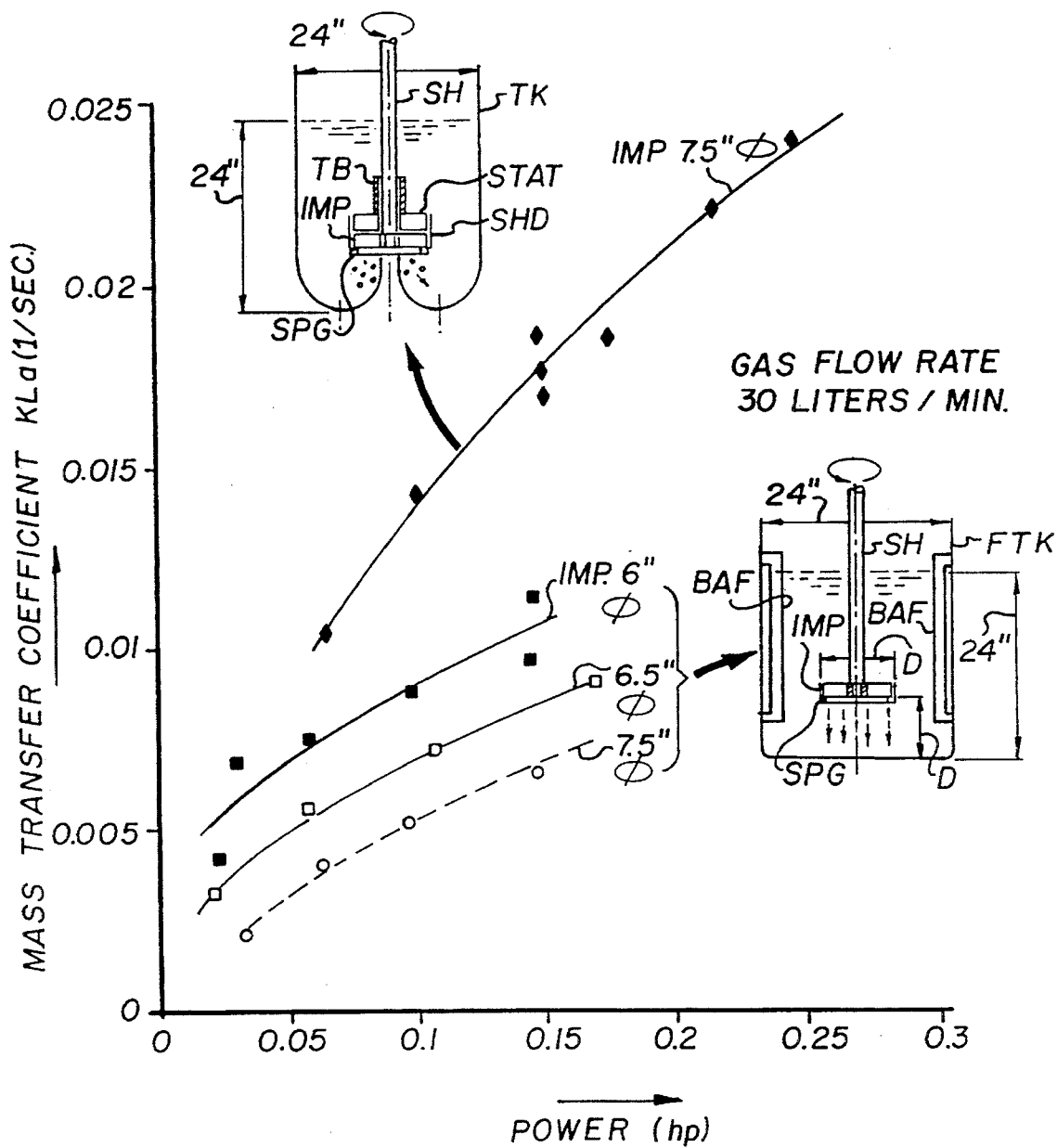
FIG. 5 is a graphical presentation of the functional relationship between a mass transfer coefficient and the power applied to an impeller drive shaft, and comparing the performance of a down-flow batch mixing system in accordance with the present invention to the performance of a conventional batch mixing system having a flat tank bottom and side wall baffles, as well as an impeller and a sparging ring only.

Referring now to FIG. 5, there are shown functional relationships between a mass transfer coefficient kLa and the power applied to a drive shaft SH of two distinctly different mixing systems.

In FIG. 5, an upper trace indicates the measured functional relationship between the mass transfer coefficient and the power applied to a drive shaft SH for the down-flow batch mixing system in accordance with an embodiment of the invention which is indicated as an inset on the upper left-hand side of FIG. 5, and which is identical to the mixing system shown on the upper left-hand side of FIG. 4. As in FIG. 4, the impeller diameter is 7.5 inches, and all data in FIG. 5 are shown for a gas flow rate of 30 liters per minute (as compared to 24 liters per minute in FIG. 4).

In a lower portion of FIG. 5, there are shown three functional relationships between the mass transfer coefficient kLa and the power (in horsepower units) applied to a drive shaft SH of a conventional flat-bottomed mixing tank FTK. The conventional flat-bottomed tank FTK has an arrangement of four conventional baffles BAF (only two are shown) disposed in equally spaced intervals radially around the inside of the tank walls. An impeller IMP having a diameter D is disposed on a drive shaft SH such that a lower surface of the impeller IMP is spaced from the flat tank bottom by a distance equal to the impeller diameter. A sparging ring SPG is depicted as disposed below the impeller IMP. The flat-bottom tank has an inside diameter of 24 inches and is filled to a level of 24 inches from the flat tank bottom with a liquid suspension schematically indicated by a dashed outline.

Associated with the experimental results obtained from the mixing system using the flat-bottomed tank FTK are the three functional relationships between the mass transfer coefficient and the power applied to the drive shaft, where each functional relationship is for a different impeller diameter, the diameter values being 6.0, 6.5, and 7.5 inches, respectively. For each of these impeller diameters the spacing between the lower surface of the impeller and the flat tank bottom was adjusted accordingly. It is noted from FIG. 5 that the smallest diameter impeller (6 inches) provides a slightly higher mixing effectiveness than the mid-size diameter impeller (6.5 inches) and the largest impeller diameter (7.5 inches).

From a comparison of the functional relationship between the mass transfer coefficient and the power applied to a drive shaft SH for the 7.5 inch diameter impeller, it is evident from the results shown in FIG. 5 that the down-flow batch mixing system in accordance with an embodiment of the invention (inset on the upper left portion of the figure), and associated with the upper trace, exhibits an improved mixing effectiveness compared to the mixing system having the flat-bottomed tank FTK (lower right portion of FIG. 5).

Comparing now the functional relationship between the mass transfer coefficient and the power applied to the drive shafts of the data sets of FIGS. 4 and 5 for the mixing system in accordance with an embodiment of the invention (insets on the upper left side of the FIGS.) it appears that the mixing effectiveness at a gas flow rate of 24 liters per minute (FIG. 4) is slightly higher at a range of lower power inputs to the impeller drive shaft than the relationship observed at a gas flow rate of 30 liters per minute (FIG. 5). That slight difference may be due to saturation effects of the gas in the liquid suspension at the higher gas flow rate.

Comparing now the functional relationships between the mass transfer coefficient and the power imparted to the drive shafts SH between the hemi-toroidal tank bottom of the tank TK having the conventional baffles BAF (lower right portion of FIG. 4) to the functional relationship obtained from the flat-bottomed tank FTK for one and the same impeller diameter of 7.5 inches (lower right portion of FIG. 5), it is apparent that the hemi-toroidal tank (FIG. 4) provides for a significantly improved mixing effectiveness relative to the mixing effectiveness obtained from the flat-bottomed tank (FIG. 5). Accordingly, although the gas flow rate of 24 liters per minute (in FIG. 4) is lower than the gas flow rate of 30 liters per minute (FIG. 5), it appears that a substantially enhanced or improved mixing effectiveness can be obtained by selecting a mixing tank having the hemi-toroidal tank bottom of the invention and conventional baffles, as compared to the results obtained from the flat-bottomed tank having the same baffles. However, as was described above, the arrangement of the complete down-flow mixing system of the invention provides a still further improvement of the mixing effectiveness at either one of the two gas flow rates used here.

Thus, the highest mixing effectiveness, as indicated by the functional relationship between the mass transfer coefficient kLa and the power applied to the drive shaft of a mixing system, is obtained with a down-flow batch mixing system in accordance with an embodiment of the invention, in which the arrangement of an impeller on an impeller hub, a stator, a shroud, and a sparging ring is such as to provide substantially swirl-free laminar flow of a liquid suspension in a mixing tank having a hemi-toroidal tank bottom of a particular hemi-toroidal profile.

From the foregoing description of the embodiments, it will be apparent that a down-flow batch mixing system has been provided in which an improved mixing effectiveness is obtained between a gas and a liquid suspension by an arrangement in a mixing tank having a hemi-toroidal tank bottom of a particular profile, and an assembly including an axial flow impeller, a stator, a shroud, and a sparging ring so that substantially swirl-free laminar flow is directed downwardly by the impeller. Various modifications to the arrangement of these components can be contemplated. For example, the unitary shroud-sparging ring member depicted in the embodiment of FIG. 2 can be incorporated in the embodiment shown in FIG. 1. Alternatively, a suitably designed sparging means may be used to introduce the gas at a position between the two opposing surfaces of the impeller and the stator. Additional means of mounting these components within the mixing chamber of the invention will undoubtedly suggest themselves to those skilled in this art. The system may be modified by providing adjacent, coaxial counter-rotating impellers to cancel swirl in the axially down-flowing stream. Such modifications are within the spirit and scope of the invention, as defined in the claims.

What is claimed is:

1. A down-flow batch mixing system for mixing a liquid under conditions of substantially swirl-free laminar liquid flow, the system comprising:

a mixing tank in which the liquid suspension is mixed, the tank having about a central axis a hemi-toroidal tank bottom extending with a monotonically increasing toroidal radius from a cylindrically shaped neck portion with an end face and formed by tank walls proximate said central axis to a cylindrically shaped and concentric upper portion of a tank wall formed radially outwardly from said neck portion;

an impeller hub radially coextensive with said end face of said neck portion and rotatably disposed adjacent thereto, said hub attached to and rotatably driven by a drive shaft concentric with said axis;

an axial flow impeller mounted to said hub, said impeller having pitched impeller blades extending radially outwardly from said hub and directing said substantially laminar flow of said liquid suspension downwardly along said neck portion and along said hemi-toroidal tank bottom;

a pitched blade assembly disposed adjacent to and radially coextensive with said impeller, said assembly having blades with a pitch relating to the pitch of said impeller blades such that the flow leaving said impeller and assembly is essentially axial; and a shroud extending around the periphery of said impeller and said pitched blade assembly.

2. The batch mixing system of claim 1, wherein said assembly is a stator and said blades are stationary.

3. The batch mixing system of claim 1, wherein gas is mixed with said liquid and a sparging ring is disposed on said shroud and radially coextensive therewith, said sparging ring adapted to receive said gas from a gas supply means and providing said gas to be mixed with said liquid suspension.

4. The batch mixing system of claim 3, wherein said stator is disposed above said impeller and said sparging ring is disposed on said shroud above said stator.

5. The batch mixing system of claim 3, wherein said stator is disposed above said impeller and said sparging ring is disposed on said shroud below said impeller.

6. The batch mixing system of claim 3, wherein said stator is disposed below said impeller and said sparging ring and said shroud being a unitary member.

7. The batch mixing system of claim 6, wherein said stator is fixedly attached to said cylindrically shaped neck portion, said unitary member is fixedly attached at the radial periphery of said stator and said drive shaft having a contoured fairing terminating at said impeller hub and radially coextensive therewith.

8. The batch mixing system of claim 3, wherein said drive shaft extends axially through said sparging ring and said stator to said impeller hub.

9. The batch mixing system of claim 1, wherein said stator is fixedly attached to a stationary cylindrical support tube concentric with said drive shaft, said tube having an outer diameter radially coextensive with said impeller hub.

10. The batch mixing system of claim 9, wherein said drive shaft extends coaxially within said support tube to said impeller hub.

11. The batch mixing system of claim 1, wherein said drive shaft extends axially through said end face of said neck portion to said impeller hub.

12. The batch mixing system of claim 1, wherein said upper portion of said tank wall has a radial distance of $R_t$ between a radially inwardly facing surface of said wall and said central axis, a radially inwardly facing surface of said shroud has a radial distance of $R_s$, to said central axis, with a ratio Rs/Rt not exceeding a value of 0.35.

* * * * *